US007774828B2

(12) United States Patent
Benenati et al.

(10) Patent No.: US 7,774,828 B2
(45) Date of Patent: Aug. 10, 2010

(54) METHODS FOR COMMON AUTHENTICATION AND AUTHORIZATION ACROSS INDEPENDENT NETWORKS

(75) Inventors: David Benenati, Somerset, NJ (US); Peretz Moshes Feder, Englewood, NJ (US); Nancy Yushan Lee, Morristown, NJ (US); Silvia Martin-Leon, Swindon (GB); Reuven Shapira, Berkeley Heights, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 939 days.

(21) Appl. No.: 10/401,595

(22) Filed: Mar. 31, 2003

(65) Prior Publication Data

US 2004/0193712 A1 Sep. 30, 2004

(51) Int. Cl.
*H04L 29/08* (2006.01)
(52) U.S. Cl. .......................................... 726/5
(58) Field of Classification Search .................. None
See application file for complete search history.

(56) References Cited

U.S. PATENT DOCUMENTS

| 6,785,256 | B2 * | 8/2004 | O'Neill | 370/338 |
| 6,879,690 | B2 * | 4/2005 | Faccin et al. | 380/247 |
| 7,028,186 | B1 * | 4/2006 | Stenman et al. | 713/173 |
| 7,539,309 | B2 * | 5/2009 | Stadelmann et al. | 380/270 |
| 2002/0012433 | A1 * | 1/2002 | Haverinen et al. | 380/247 |
| 2002/0120872 | A1 | 8/2002 | Amada et al. | |
| 2002/0147820 | A1 * | 10/2002 | Yokote | 709/229 |
| 2003/0014646 | A1 * | 1/2003 | Buddhikot et al. | 713/184 |
| 2003/0031151 | A1 * | 2/2003 | Sharma et al. | 370/338 |
| 2003/0084287 | A1 * | 5/2003 | Wang et al. | 713/168 |

(Continued)

FOREIGN PATENT DOCUMENTS

JP     2000-010045     1/2000

(Continued)

OTHER PUBLICATIONS

Benenati et al., A Seamless Mobile VPN Data Solution for CDMA2000, UMTS and WLAN Users, *Bell Labs Technical Journal*, vol. 7, No. 2. (Dec. 2, 2002—pp. 143-165).

(Continued)

*Primary Examiner*—Matthew B Smithers
*Assistant Examiner*—David J Pearson
(74) *Attorney, Agent, or Firm*—Harness, Dickey + Pierce, P.L.C.

(57) ABSTRACT

Common authentication and authorization (AA) between networks having disparate access technologies may enable a seamless user transition between the networks. A set of AA credentials from a user attempting to gain access to one of the networks may be received, and a subscriber database of another of the networks may be used to verify the set of AA credentials. A communication protocol common to the networks may be used. Additionally, the user may employ a single set of authentication and authorization (AA) credentials, usable over multiple communication protocol layers. Further, a user may perform a single authentication and authorization (AA) operation when roaming across two or more networks by gathering user's key material during an AA challenge and reply session at a data link layer. The gathered material may be used for an AA challenge at an upper network layer or another network as the user transitions between networks.

5 Claims, 3 Drawing Sheets

U.S. PATENT DOCUMENTS

| | | | |
|---|---|---|---|
| 2003/0208602 A1* | 11/2003 | Bhalla et al. | 709/227 |
| 2004/0001468 A1* | 1/2004 | Bichot et al. | 370/338 |
| 2004/0122959 A1* | 6/2004 | Lortz | 709/229 |
| 2004/0203752 A1* | 10/2004 | Wojaczynski et al. | 455/432.1 |
| 2004/0208151 A1* | 10/2004 | Haverinen et al. | 370/338 |

FOREIGN PATENT DOCUMENTS

| JP | 2002-152276 | 5/2002 |
|---|---|---|

OTHER PUBLICATIONS

Haverinen et al., Cellular Access Control and Charging for Mobile Operator Wireless Local Area Networks, *IEEE Wireless Communications, IEEE Service Center*, vol. 9, No. 6 (Dec. 2002—pp. 52-60).

Gustafsson et al., Always Best Connected, *IEEE Wireless Communications, IEEE Service Center*, vol. 10, No. 1 (Feb. 2003—pp. 49-55).

European Search Report, dated May 7, 2004.

Office Action for corresponding Japanese Patent Application No. 2004-101673 dated Nov. 16, 2009.

Shigefusa Suzuki, et al., "A Proposal of the Authentication in Providing Loaming Service in Personal Communication System", Technical Report of IEICE, vol. 96, No. 97, Jun. 17, 1996, p. 79-85, IN96-30. Abstract Only.

Ken Ojiri, et al., "A Service Controlling Method with Network Security in Advanced Intelligent Network", Technical Report of IEICE, vol. 98, No. 84, May 29, 1998, p. 31-38, SSE98-37 (English Abstract Only).

* cited by examiner

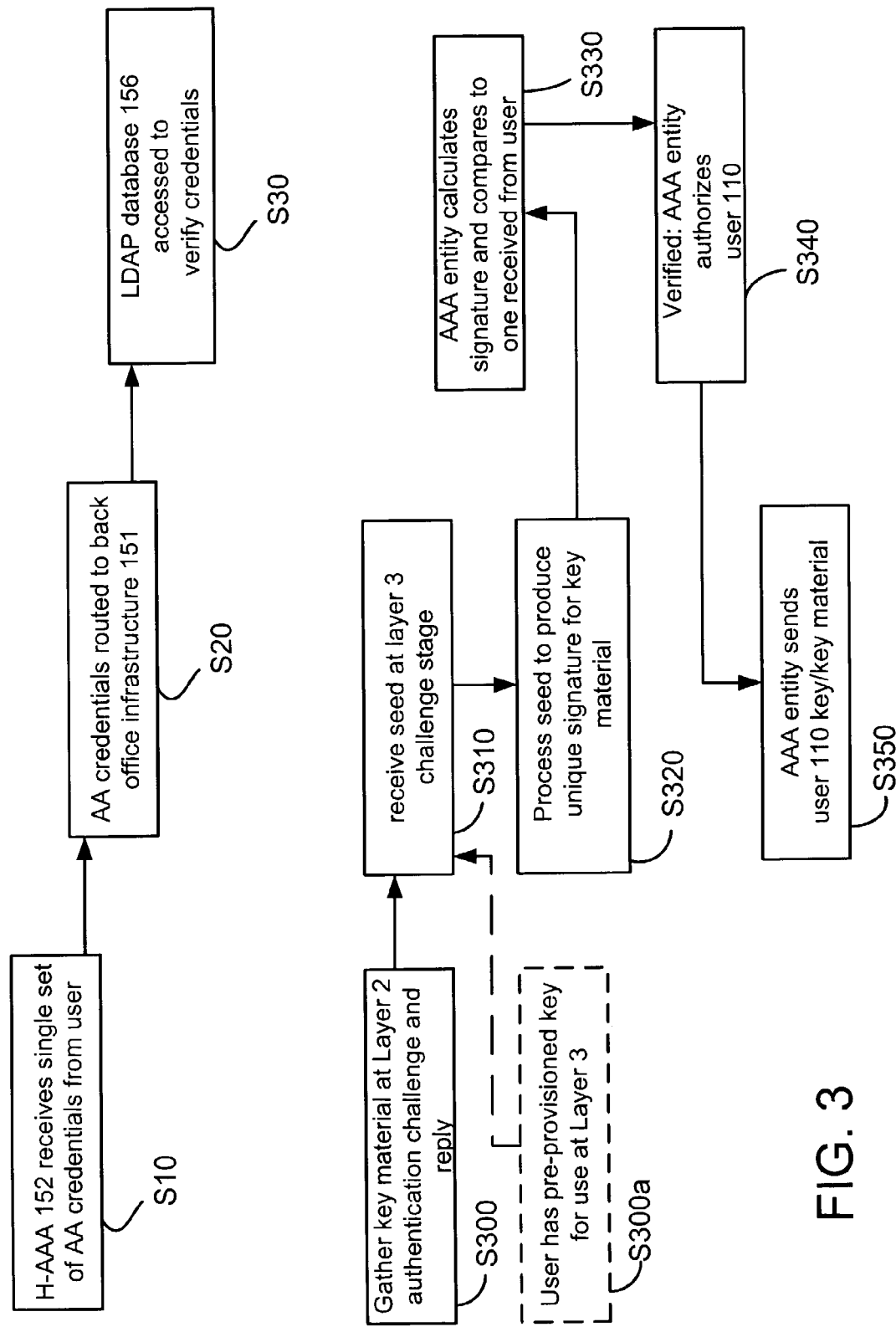

METHODS FOR COMMON AUTHENTICATION AND AUTHORIZATION ACROSS INDEPENDENT NETWORKS

BACKGROUND OF THE INVENTION

1. Field of the Invention

The present invention relates to methods for common authentication and authorization across independent networks having disparate access technologies.

2. Description of Related Art

Users of high speed packet data services may include users that, although stationary while connected, are portable (i.e., connectable from different locations) as well as users who are moving while connected. Some access technologies (e.g., IEEE 802.11b) focus on relatively stationary but portable wireless users in relatively small (intra-city) coverage areas. Networks or communication systems based on these access technologies may be referred to as Wireless LANs (WLANs). Other wireless technologies, such as those employing code division multiple access (CDMA) technologies, are typically designated for wide area coverage and accommodate data users who may be moving at high speeds (e.g., in a vehicle or train) over large distances (e.g., inter city, cross-country, trans-oceanic).

Systems employing wide area technologies, such as General Packet Radio Service (GPRS), cdma2000, or Universal Mobile Telecommunication System (UMTS), may generally be referred to as 2.5G or 3G systems. Wireless 2.5G and third generation (3G) communication systems are currently introducing technologies in order to be spectrally efficient while increasing capacity and supporting data services. These efforts have resulted in the development of the 3G-1x, 1xEV-DO, and 1xEV-DV standards, for example. Similarly, the UMTS standard has introduced several advanced technologies or enhancements as part of the High Speed Downlink Packet Access (HSDPA) specification in order to accommodate data users traveling substantial distances at high speeds. However, the data rates currently achievable by 2.5G/3G wide area cellular networks providers are typically not as high as data rates achievable in WLANs.

Accordingly, since 2.5G/3G systems (e.g., GPRS, CDMA, UMTS) and WLANs (e.g., systems implementing EEE 802.11b) have complementary strengths, users may wish to use both. One area impacted by the desire to use both systems is authentication and authorization (AA), so as to gain access to either network. Authentication is a process by which a network or system verifies that an accessing user or subscriber is who they say they are. Authorization is a process of verifying that a particular subscriber has a valid account, can pay for service, and/or is permitted to use a particular service. However, at present, a user requires separate accounts and authorization credentials for each system being accessed. Thus, a seamless user transition between networks is not possible, as the user (or the user's client software) is required to repeatedly authenticate and obtain authorization in order to gain access across the multiple disparate networks.

SUMMARY OF THE INVENTION

Methods of providing common authentication and authorization (AA) between independent networks having disparate access technologies may enable a seamless user transition between the networks. A set of AA credentials from a user attempting to gain access to one of the networks may be received, and a subscriber database of another of the networks may be used to verify the set of AA credentials. A communication protocol common to the networks may be used. Additionally, the user may employ a single set of authentication and authorization (AA) credentials, usable over multiple communication protocol layers. Further, a user may perform a single authentication and authorization (AA) operation when roaming across two or more networks by gathering user's key material during an AA challenge and reply session at a data link layer. The gathered material may be used for an AA challenge at an upper network layer or another network as the user transitions between networks.

In another exemplary embodiment, the user's set of AA credentials may be forwarded as part of an authentication request from a visited network to an independent proxy AAA server, and the authentication request from the proxy AAA server may be relayed to the user's cellular service provider. The user's cellular service provider may forward the user's set of AA credentials as part of an authentication request directly to the user's private home network, or may proxy the request to another proxy AAA server which in turn relays the request containing the user's set of AA credentials to the user's private home network.

BRIEF DESCRIPTION OF THE DRAWINGS

Exemplary embodiments of the present invention will become more fully understood from the detailed description given herein below and the accompanying drawings, wherein like elements are represented by like reference numerals, which are given by way of illustration only and thus are not limitative of the exemplary embodiments of the present invention and wherein:

FIG. 2 is a flowchart describing a method in accordance with an exemplary embodiment of the invention;

FIG. 3 is a flowchart describing a method in accordance with another exemplary embodiment of the invention.

DETAILED DESCRIPTION

Although principles of the present invention are described in the context of integrating wide area cellular wireless communication systems such as 2.5G/3G systems with Wireless Local Area Network (WLAN) systems for common authentication and authorization (AA), and will be described in this exemplary context, it should be noted that the exemplary embodiments shown and described herein are meant to be illustrative only and not limiting in any way. As such, various modifications will be apparent to those skilled in the art for application to other transmission systems and are contemplated by the teachings herein. For example, the exemplary embodiments could be configured to integrate any two systems for common AA where System 1 and System 2 are of different access network technologies, i.e., System 1 could be a wireline xDSL system and System 2 could be a 3G cdma2000 system.

If used herein, any of the terms base station, access network, radio access network (RAN) or radio network (RN), system equipment or Node-B may be synonymous, for example. Each term may describe equipment that provides data connectivity between a packet data network (PDN) such as the Internet, and one or more mobile stations, for example. Additionally, the terms mobile station, mobile user, user, user equipment (UE), mobile, remote station, mobile subscriber or subscriber, if used herein, may be considered synonymous, and may describe a remote user of wireless resources in a wireless communication network or a device providing data connectivity to a user, for example.

Exemplary embodiments of the present invention are directed to methods of providing common authentication and authorization (AA) between independent networks. In an exemplary embodiment, a set of AA credentials from a user attempting to gain access to one at least two networks is received, and a subscriber database owned by one of the two networks is accessed to verify the set of AA credentials.

Another exemplary embodiment uses a communication protocol common to the two networks to authenticate and authorize the AA credentials of the user. A further exemplary embodiment is directed to a method by which a user accesses two or more independent networks, where the user employs a single set of authentication and authorization (AA) credentials, usable over multiple communication protocol layers, to access either network. Another exemplary embodiment is directed to a method by which a user performs a single authentication and authorization (AA) operation when roaming across at least two independent and disparate access networks, where user authentication and key material is gathered during an AA challenge at a data link layer, and the gathered key material is communicated for an AA challenge at an upper network layer, as the user transitions from one access network to another access network.

Figure 1:
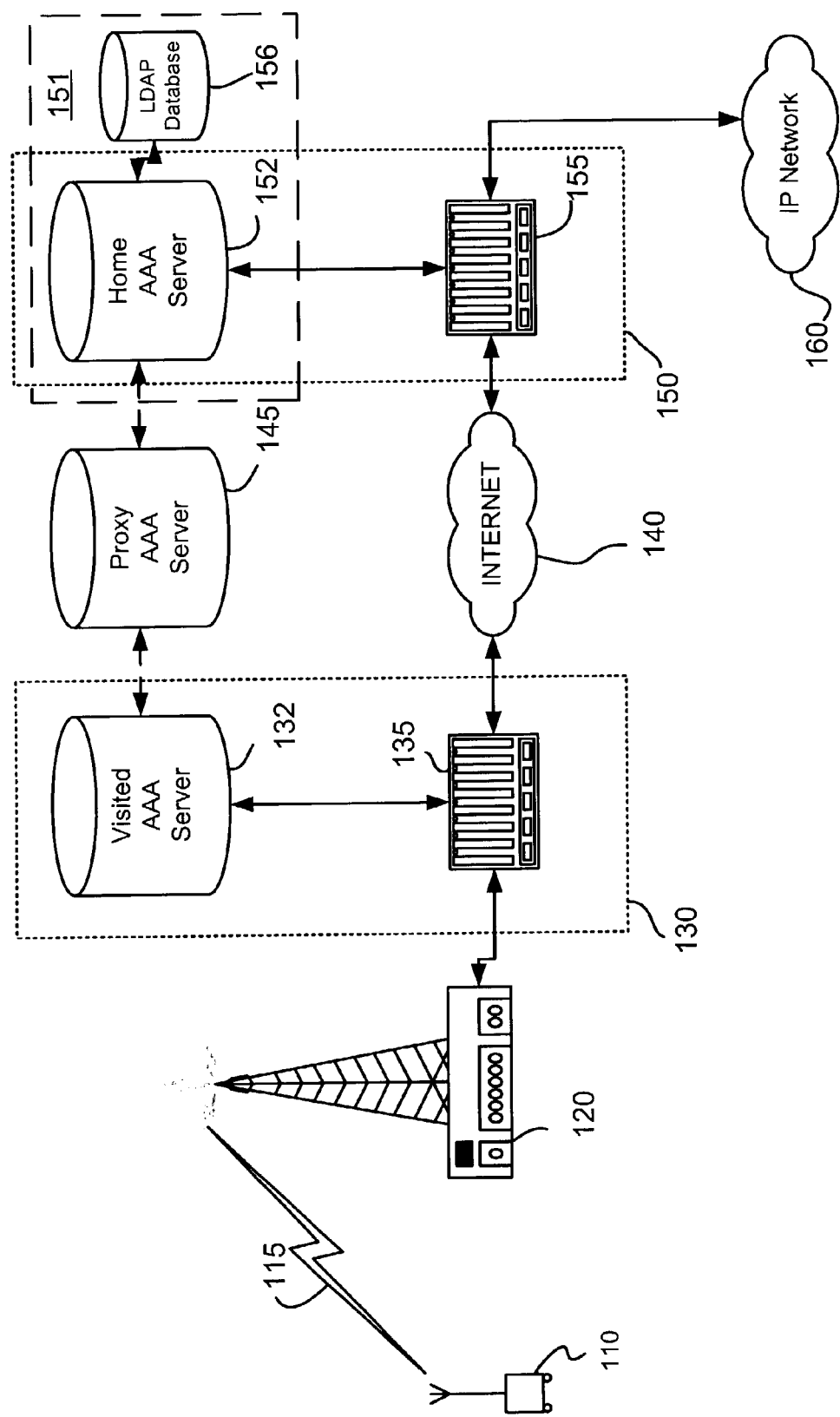
FIG. 1 illustrates a network configuration between a user and the user's home network in accordance with an exemplary embodiment of the invention.

FIG. 1 illustrates a network configuration between a user and the user's home network in accordance with an exemplary embodiment of the invention. Referring to FIG. 1, a user 110 communicates via a link 115 to a radio network 120 serving a particular sector the user 110 is located in, for example. The user 110 may be sending an authentication request message to access the user 110's home network. In FIG. 1, RN 120 happens to be part of a visited access provider network 130.

A Visited Authentication, Authorization and Accounting server 132 (V-AAA Server) is the AAA server that resides in the visited access provider network 130. The visited service provider provides access services to a user through the establishment of a service agreement with a home service provider. In FIG. 1, visited access provider network 130 may be embodied as a visited network of a WLAN system, for example.

V-AAA server 132 may be embodied as a Remote Authentication Dial In User Service (RADIUS) server that operates according to the RADIUS protocol, for example; however, the exemplary embodiments are not so limited, as V-AAA server 132 may be configured so as to operate based on other protocols, such as the Diameter protocol, for example. These protocols are intended to provide a AAA framework for applications such as network access, IP mobility, etc. V-AAA 132 may communicate with a router 135 such as a packet data serving node (PDSN) or a gateway GPRS support node (GGSN).

In Mobile Internet Protocol (Mobile IP or MIP), a router in the visited network serves as a foreign mobility agent for the mobile node. As specified in the Internet Engineering Task Force (IETF) RFC 3344, for example, a Foreign Agent (FA) may work in conjunction with another type of mobility agent known as a Home Agent (HA) to support Internet traffic forwarding for a device connecting to the Internet from any location other than its home network. The HA tunnels datagrams (packets) intended for the mobile node to a care-of address, which is either the IP address for the FA or an IP address acquired through some external means such as Dynamic Host Configuration Protocol (DHCP). The FA detunnels packets and delivers them to the mobile node.

A PDSN is in every cdma2000 data network, for example. For mobile subscribers, a PDSN is the point of entry into the wireless packet data network. The PDSN performs two basic functions: (1) exchanges packets with the mobile station over the radio network; and (2) exchanges packets with other IP networks. To perform these functions, the PDSN may interface with a Radio Network Node (frequently called a Packet Control Function or PCF), with a RADIUS AAA server (used for user authentication, authorization and session accounting), and with HAs for Mobile IP applications, for example. A GGSN is a gateway in a UMTS network that allows mobile users to access a public data network (PDN) or specified private IP networks. The functions performed by the GGSN are analogous to those performed by the PDSN. While a PDSN contains FA functionality, GGSN may or may not.

In the case of Mobile IP the router 135, which contains a FA, and the HA 155 may communicate via the Internet 140, whereas V-AAA server 132 and a Home Authentication, Authorization and Accounting server 152 (H-AAA server 152) may communicate via a proxy AAA server 145. A function of the proxy AAA server 145 is to find the user 110's H-AAA server 152. As will be discussed in further detail below, H-AAA server 152 may own a subscriber database called a Lightweight Directory Access Protocol (LDAP) database 156. LDAP database 156 may used for authentication and authorization (AA) by both the home network 150 and visited network 130.

The proxy AAA server 145 may be useful because the visited network 130 might not recognize the home domain of the user. For example, an ISP (visited network 130) in Australia might not recognize a Verizon network indicated by the user realm "user@verizon.com", so it forwards the realm information to a proxy AAA server so that the proxy AAA server 145 can relay the request to the correct home network of the user 110, where the user's AA credentials are stored.

H-AAA server 152 resides in Home IP network 150. The Home IP network 150 is the home network that provides IP based data services to the user 110. The network 150 may be accessible according to the user 110's network access identifier (NAI). The NAI is a user@domain construct which identifies the user and its home IP network. The Home IP Network 150 may be a private network, enterprise network, publicly accessible ISP network, cdma2000 wireless network, etc. In FIG. 1, Home IP Network 150 may be embodied as a home network of a cellular wireless 2.5G/3G system, for example.

H-AAA 152 may be embodied as a Remote Authentication Dial In User Service (RADIUS) server, for example. However, the exemplary embodiments are not so limited, as H-AAA server 152 may be configured so as to understand and operate based on the Diameter protocol. The H-AAA server 152 communicates with a Home Agent (HA) 155. In Mobile Internet Protocol (Mobile IP), a HA is a router in a mobile node's home network that maintains information about the device's current location, as identified in its care-of address. Like the FA, HA 155 is a type of mobility agent, such as is defined in the IETF RFC 3344 specification, for example.

In order for the cellular wireless provider to own and bill user 110 when the user seamlessly roams between access technologies, a single set of authentication credentials should be applied to the authorizing and authenticating agent (H-AAA 152/V-AAA 132) in each of the networks being accessed. In other words, the authentication entity of the WLAN (visited network 130) may need to interface with a pre-provisioned authentication database owned by the cellular wireless service provider (e.g., in this exemplary embodiment, this may be home IP network 150, which may be embodied as a 2.5G/3G CDMA or UMTS network). Enabling communications between WLAN and 3G infrastructures for authentication and authorization enables the user's home ISP 150 to authenticate the user 110 both at WLAN system 130 and 2.5G/3G system 150.

For example, the wide area cellular wireless service providers' existing back-office infrastructure may be reused to provide authorization and authentication for an independent visited network 130. In the context of AA, wide area cellular wireless service provider's (WSP's) existing back-office infrastructure may refer to the equipment used to perform authorization and authentication of packet data service for wireless users. The particulars may vary depending on the service provider, but may consist of some sort of database that is used to provision all the subscribers, such as a Lightweight Directory Access Protocol (LDAP) database. LDAP is an online directory service protocol defined by the Internet Engineering Task Force (IETF) that is a simplification of Directory Access Protocol (DAP). An LDAP directory entry is a collection of attributes with a unique identifier, called a distinguished name (DN). The directory system may be in a hierarchical structure, for example. In this exemplary embodiment, Home IP network 150 may be said to own LDAP 156.

H-AAA server 152 and LDAP 156 may be an example of back office infrastructure 151, as shown in dotted-line in FIG. 1, although the present invention is not so limited. Any cdma2000 packet data network which has a AAA server that authorizes and authenticates users for packet data service may represent existing back-office infrastructure. Further, service providers such as VERIZON WIRELESS and SPRINT PCS, for example, offer 3G packet data service; thus such back-office infrastructure is already in place. In one exemplary embodiment networks 130 and 150 may be owned by different service providers and in another exemplary embodiment they both may be owned by the same service provider.

FIG. 2 is a flowchart describing a method in accordance with an exemplary embodiment of the invention. Referring now to FIG. 2, the H-AAA server 152 may receive (Step S10) a single user-id and authentication key (e.g., password) from user 110. This set of AA credentials has been assigned to user 110, and can be used for authentication and or encryption on either network 130 or 150. In other words, the AA credentials may be commonly used in disparate access technologies. The single user-id and password may be routed (Step S20) to the existing back office infrastructure 151 of the user 110's home network. In this exemplary embodiment, the existing back office infrastructure 151 of the Home IP network 150 (3G system) is being used or accessed (Step S30) to verify the user 110's set of AA credentials against a stored set of AA credentials. Thus, LDAP database 156 and H-AAA server 152 may offer an arrangement that provides independent visited networks that have Service Level Agreement with the home network the ability to authenticate and obtain authorization from the existing back-office infrastructure of a particular service provider.

Relying on the AAA infrastructure enables the wide area cellular wireless provider to authenticate the subscriber 110 using the same authentication credentials in both networks 130 and 150. The WLAN and 2.5G/3G systems may both use a common AAA protocol, such as RADIUS or Diameter for example, in order to authenticate the user at a AAA server, possibly via a proxy AAA server 145. The authentication servers (H-AAA server 152/252 and V-AAA server 132) may be the same, or may be different, so long as each AAA server can access the LDAP database 156 to retrieve the user 110's common authentication key and/or password.

However, there may be a scenario where one network may need to relay the user's set of AA credentials to another network that does not have the credentials, but which requires them for AA. For this reason, a AAA proxy based-approach may be more suitable for this application. When a AAA proxy server 145 receives an authentication request message, it uses the user 110's NAI to resolve the authoritative AAA server (e.g., H-AAA server 152) and to forward the authentication request message to the appropriate H-AAA server. Connection between AAA infrastructures of different service providers may be done directly or via AAA proxy server 145.

For example, a user 110 may access a visited network 130 that may use different attributes (vendor specific attributes in RADIUS, for example) within the common communication protocol to forward the user 110's set of AA credentials and identifying information (e.g., network type, identity, etc.) of the visited network 130 to the proxy AAA server 145. AAA proxy operations generally may require attribute translation to map the different proprietary Vendor Specific Attributes being used in the RADIUS messages to the attributes being used by the user's Home IP network 150. There are a number of initiatives to standardize these attributes, as they are sent between various Service Providers, such as the Wireless Internet Service Provider roaming (WISPr) committee within the Wi-Fi Alliance, and the Third Generation Partnership Project 2 (3GPP2).

In another exemplary embodiment, the user 110 only needs to authenticate once, even while roaming across multiple networks. Current WLAN authentication schemes may require two separate authentications: first authenticating the device (e.g., PDA, PC, cell phone, etc.) at the data layer (Layer 2) and second authenticating the user (user-id and password) at the network layer (Layer 3). One-pass authentication across multiple communication layers or across multiple networks of differing technologies (e.g., wide area cellular network and WLAN) is currently not achievable, because multiple databases are involved in device authentication at Layer 1 and Layer 2, followed by Layer 3 user authentication. If the user also runs IP Security (IPSec) or Session Initiation Protocol, an additional layer (Application layer) of authentication is also required. These multi-layer authentications may cause a data session to pause while the terminal is engaged in authentication requests, both upon initial connection and upon inter-technology handoff. This places a burden on the user and/or the client software and increases delays and provisioning complexities.

For Mobile IP (MIP) protocols in cdma2000, authentication procedures may be considered as one-pass authentication processes already. In cdma2000, when a user requires a MIP registration, layer 2 negotiation with the authenticating agent (H-AAA, V-AAA or proxy server) indicates that the user is a Mobile IP user. Under these conditions, Layer 2 authentication is bypassed and a link layer connection may be established without AA. Accordingly, in MIP for cdma2000, it is left to Layer 3 to complete the AA negotiation. This type of layer 2 establishment does not provide any services to the user other than the option to negotiate layer 3 AA. An equivalent technique is not presently available for WLAN and UMTS networks.

The exemplary embodiments of the present invention replace the double-pass authentication with a one-pass authentication scheme, where the same set of credentials may be used for multiple layers, and where multiple accesses to the AAA infrastructure are thus avoided, reducing delays and latency. In the exemplary embodiments of the present invention, several approaches may be used for providing one pass authentication in WLAN systems such as visited network 130. One approach may be to use the same credentials and key material to authenticate at Layers 2 and 3. Another approach may be to proceed directly to Layer 3, omitting Layer 2 authentication altogether. This is similar to the procedure described above with MIP for cdma2000 networks.

FIG. 3 is a flowchart describing a method in accordance with another exemplary embodiment of the invention. Referring to FIG. 3, multiple accesses to the AAA infrastructure (AAA server) may be required, but traversing the network for key material may be done only once. That key material, gathered during the Layer 2 AA successful reply at the end of the negotiation challenge (Step S300), may used by a client software residing at the user 110's terminal, for example, to encrypt the payload or to respond to future AA challenges presented to the user 110 by the AAA entity (i.e., V-AAA, H-AAA, etc.)

During the challenge stage at Layer 3 a seed is provided (Step S310) to user 110 by the network. User 110 or the user's client software processes the seed with a pre-provisioned key (Step S300a in dotted line) or with the key material obtained previously from Step S300 and produces (Step S320) a signature unique to that key material. Examples of algorithms which may be used or implemented in order to produce the unique signature include Message Digest version 5 (MD5), Secure Hash Algorithm (SHA), etc. A unique signature is similarly calculated (Step S330) by the AAA entity, where the same user key is located, and the result is compared to the unique signature calculated by the user's client. Upon verification of the signature the AAA entity authorizes (Step S340) the user 110 and may send (Step S350) a key for encryption and a new key material to be used in a future authentication process.

The same one-pass authentication scheme may be used for both the WLAN and 3G systems; thus it may become possible for client software at the user 110 to automatically supply the user 110's authentication credentials whenever the user 110 moves between air interface technologies (e.g., from WLAN to 3G and vice versa). The client software of user 110 may provide authentication credentials to gain access to the domain and, if the user 110 is in a visited domain, may be able to establish a Security Association with the user 110's home network 150.

The realm in the user NAI may provide the visited AAA server (e.g., V-AAA server 132) with the domain information used to determine the home domain that will be used to authenticate the user 110. The client software may thus communicate, to Layer 3, the key material gathered during the prior AA authentication at layer 2. Thus, the user 110 may be required to type a unique password or a key material during the initial AA stage, but may not be required to reenter it when moving to a new domain, and may be shielded from the underlying authentication activities, facilitating an uninterrupted transparent data session movement. Accordingly, one-pass authentication may reduce the amount of AAA communication, possibly reducing delays, latency, and the amount of user interruption required to enter password and/or unique key information at each layer.

Figure 4:
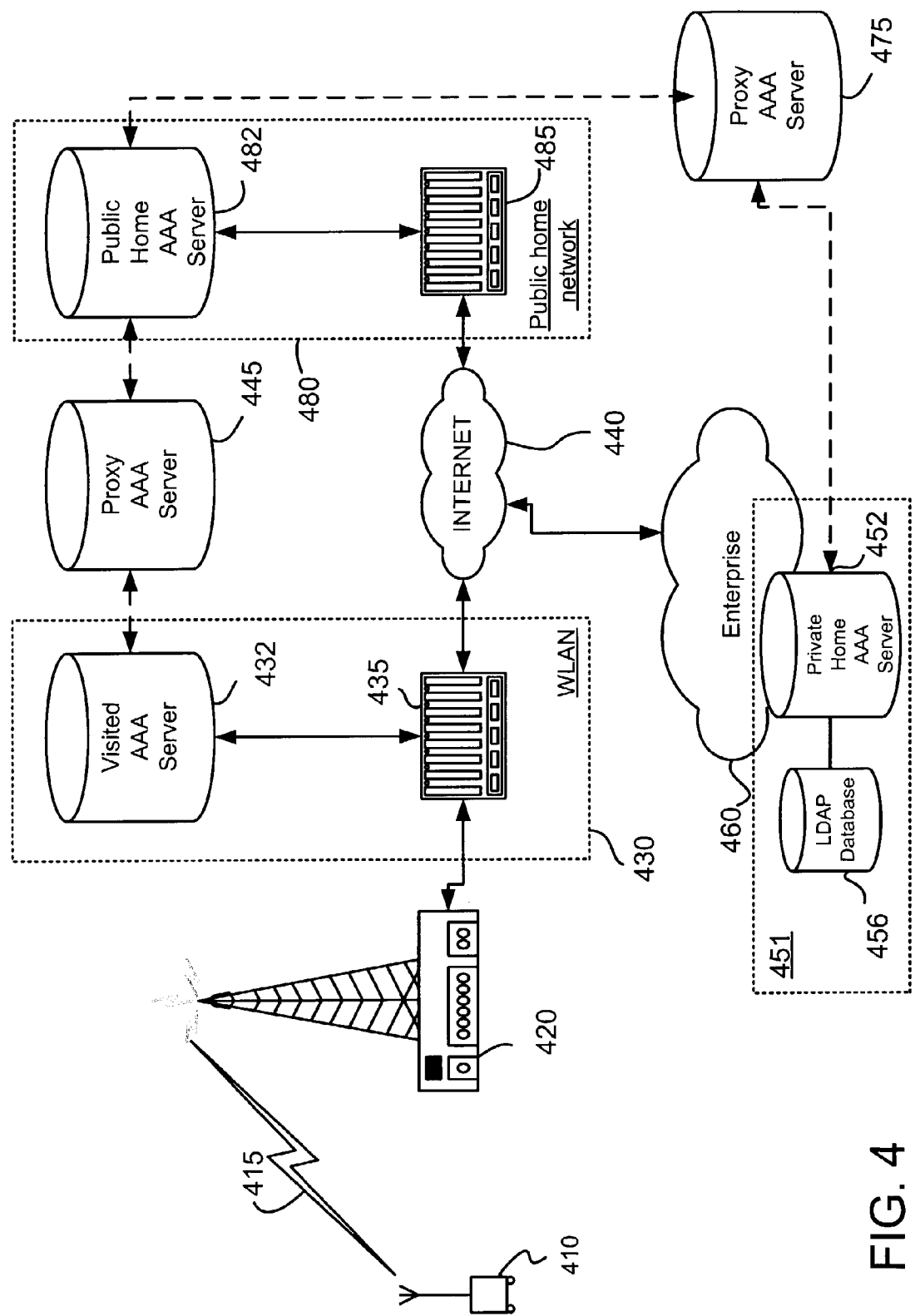
FIG. 4 illustrates a network configuration between a user and the user's home network in accordance with another exemplary embodiment of the invention.

FIG. 4 illustrates a network configuration between a user and the user's home network in accordance with another exemplary embodiment of the invention. As previously discussed with respect to FIG. 1, the authentication entity of the WLAN may need to interface with a pre-provisioned authentication database owned by the cellular wireless service provider. Enabling communications between WLAN and 3G infrastructures for authentication and authorization enables the user's home ISP 150 to authenticate the user 110 both at WLAN system 130 and 2.5G/3G system 150. FIG. 4 illustrates an exemplary embodiment where the user's cellular service provider (also occasionally referred to as the "user's public home network") appears to the outside world to be the user's home ISP, but the user's "private Home IP network" is the user's enterprise, rather than the WLAN or user's cellular service provider.

FIG. 4 is similar to FIG. 1, thus only the differences are discussed for reasons of clarity. Referring to FIG. 4, the user's public home network 480 may be embodied as a cellular network, and the user' private Home IP network may embodied as enterprise network 460. In this exemplary embodiment, the authentication entity of the WLAN (visited network 430) may need to interface with a pre-provisioned authentication database (LDAP database 456) owned by the enterprise network 460. V-AAA server 432, or a proxy AAA server 445 may user part of the user 410's NAI to resolve the AAA server 482 of the cellular service provider (public home network 480) and to forward the authentication request to the user's public home network 480. The cellular service provider's AAA server 482 may need to further proxy the AAA request via a proxy AAA server 475. It may do so by using another part of the user 410's NAI to resolve the H-AAA server 452 located at the enterprise network 460.

As in FIG. 4, back office infrastructure 451 of the enterprise network 460 may include H-AAA server 452 and LDAP database 456, for example. Accordingly, and as shown in the exemplary embodiment of FIG. 4, the NAI of user 410 may be user@lucent.verizon.com, where Verizon's (Verizon is the user's cellular service provider) AAA server 482 is accessed (possibly via proxy server 445) from the WLAN 430. Verizon's AAA server 482 in turn may proxy the request via proxy AAA server 475 to the H-AAA server 452 in the user's enterprise network 460 (i.e., Lucent).

The exemplary embodiments of the present invention being thus described, it will be obvious that the same may be varied in many ways. Such variations are not to be regarded as a departure from the spirit and scope of the exemplary embodiments of the present invention, and all such modifications as would be obvious to one skilled in the art are intended to be included within the scope of the following claims.

What is claimed is:

1. A method by which a user performs a one-pass authentication and authorization (AA) operation when roaming across at least two independent networks, said networks using an AAA infrastructure for authentication and authorization over multiple communication protocol layers, comprising:
   gathering key material of the user during an AA challenge and reply session at a data link layer of a first network of the at least two independent networks with different access network technologies;
   receiving a seed during a subsequent AA challenge at a network layer of the multiple communication protocol layers as the user transitions from the first network to another network by performing said one-pass AA operation; and
   using the key material and the seed to generate a unique signature for a reply to a subsequent AA challenge.

2. The method of claim 1, wherein said at least two networks include a wireless local area network (WLAN) and a wide area cellular communication system.

3. The method of claim 2, wherein said wide area cellular communication system is one of a GPRS, cdma system and UMTS.

4. The method of claim 1, wherein said using further includes
   using the key material for data encryption or
   using the gathered key material of the user during another network challenge, said at least two networks include a visited network and the user's home network, and said at least two networks use different attributes of a common protocol.

5. The method of claim 4, wherein (i) using the key material for data encryption and (ii) using the gathered key material are performed without user involvement.

* * * * *